Figure 1:
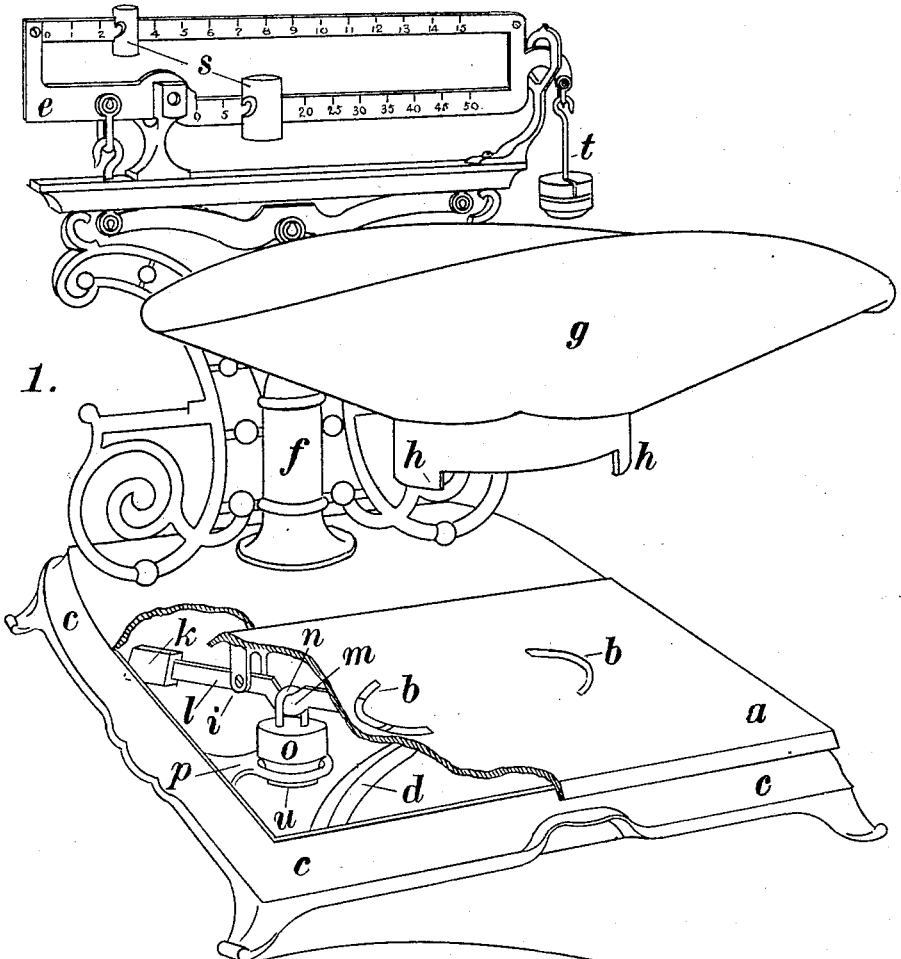

(No Model.)

F. W. TAYLOR.
SCOOP BALANCE DEVICE.

No. 548,479. Patented Oct. 22, 1895.

WITNESSES:
Frank O. French
Willis H. Sargent

INVENTOR
Frederick W. Taylor
BY
C. S. Sturtevant,
ATTORNEY.

UNITED STATES PATENT OFFICE.

FREDERICK W. TAYLOR, OF ST. JOHNSBURY, VERMONT, ASSIGNOR TO THE E. & T. FAIRBANKS & COMPANY, OF SAME PLACE.

SCOOP-BALANCE DEVICE.

SPECIFICATION forming part of Letters Patent No. 548,479, dated October 22, 1895.

Application filed June 22, 1895. Serial No. 553,673. (No model.)

*To all whom it may concern:*

Be it known that I, FREDERICK W. TAYLOR, a citizen of the United States, residing at St. Johnsbury, in the county of Caledonia, State of Vermont, have invented certain new and useful Improvements in Scoop-Balance Devices, of which the following is a description, reference being had to the accompanying drawings, and to the letters of reference marked thereon.

My invention relates to an improvement in scales, and particularly to an improved scoop-balance device, and my object is to provide a device in which the load is normally supported by the platform; but when the scoop is placed on the platform the weight is supported from the frame, the load on the platform being therefore unchanged, whereby a device much simpler and less expensive to manufacture than any of which I am aware is provided.

Prior to my invention it has been proposed to balance the scoop by a weight that is picked up, said weight being supported outside of and independent of the platform or weighing mechanism of the scale; and it has also been proposed to have a pick-up weight-balancing device where the weight is made to counterbalance the weight of the scoop by an arm pressing on the under side of the scale-platform. In another device a load or counterbalance is supported on the end of the weighing-beam when the scoop is not in use; but when in use the load is picked up from the weighing-beam and supported from the platform by a shorter fulcrum, the difference in the fulcrum compensating for the weight of the scoop. In still another device by operating a lever underneath the platform through a projection on the scoop a cage having a ball supported on the end of the beam is dipped, and by the ball rolling from one end of the cage to the other the weight of or removal of the scoop is compensated. In still another device a lever carrying a weight is pivoted to the scale-platform, one end of said lever projecting above the platform, so that when the scoop is put on it strikes the projecting portion and forces the same down, the weight balancing the platform. The present invention, however, distinguishes from all these in that it comprises a lever pivoted to the scale-platform, having one end provided with a permanent weight and having on its other arm a weight, which, under certain circumstances, may be free of the arm of the lever. When it is not desired to use the scoop, the preponderance of weight is in favor of the permanent weight and the long arm of the lever bears against the under side of the scale-platform. When, however, the scoop is placed on the platform, the projection thereon rests on the long arm of the lever, forcing down the long arm of the lever, thus depositing said second weight on its support, the permanent weight then serving to balance the scoop, the load in which is carried by the scale-platform.

My invention is illustrated in the accompanying drawings, in which—

Figure 2:
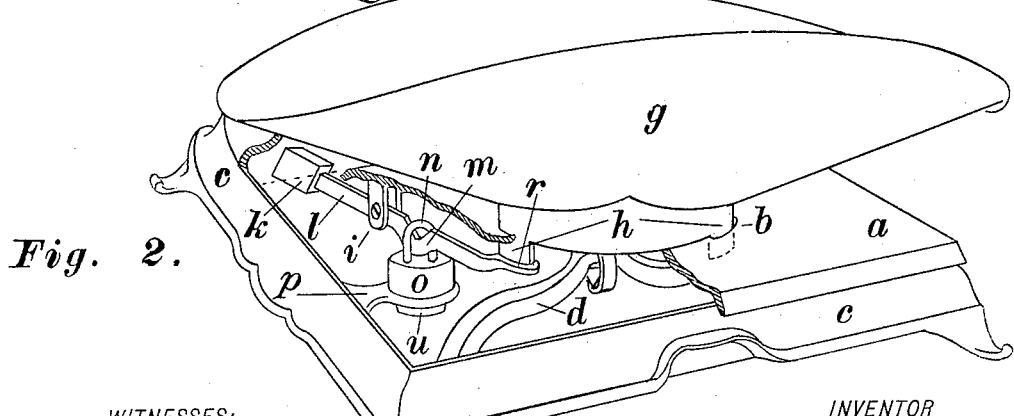

Figure 1 is a perspective view of a scale, showing my invention, the scoop being removed and part of the scale being shown in section; and Fig. 2 is a perspective view showing the scale-platform, partly in section, with the scoop applied.

In the drawings, $c$ represents the rectangular base of a platform-scale supported in the usual way. $f$ is the upright standard resting thereon and carrying the double beam $e$, upon the parts of which move the poises $s$, all said parts being of usual construction.

The platform of the scale is represented at $a$, and is provided with two curved slots $b$, adapted to receive downward projections $h$ upon the scoop $g$. The platform is connected to the multiplying-levers and the beam in the usual way. The scoop-balance lever is shown at $l$ and is pivoted between lugs $i$, depending from the under side of the platform. One arm of said lever carries the weight $k$, which is permanently attached to the end of said arm, while the end of the opposite or long arm of the lever, as shown at $r$, normally bears against the under side of the platform, the weight $k$ normally tending to keep said arm $m$ elevated. Attached to the base $c$ and projecting inwardly is a lug $p$, formed with an annular open portion adapted to receive the weight $o$, which has a loop $n$, adapted to be lifted by the long arm $m$, said loop fitting in a notch in said arm $m$ of the lever $l$. The weight $o$ should be of exactly the same weight as the scoop $g$, and the permanent weight $k$ should be approximately the same weight. A variation, however, of one ounce, more or less, will make no difference in the correct working of the device.

When it is not desired to use the scoop, the weight $k$ pulls down the arm $l$ and raises the arm $m$, thus picking up the weight $o$, the point $r$ bearing against the under side of the scale-platform, this being accomplished by placing the notch in which the weight $o$ hangs nearer the fulcrum $i$ than the permanent weight $k$, so that the preponderance of weight will be in favor of weight $k$. When, however, the scoop is placed on the platform and the projections $h$ pass through the openings $b$, one of these projections rests on the point $r$, and as the point $r$ is farther from the fulcrum $i$ than the weight $k$ the preponderance of weight is now in favor of the scoop, which forces down the long arm of the lever $l$, thus depositing the weight $o$ in the ring adapted to receive it, in which position the lever $m$ passes through the loop $n$ without touching, the load in the scoop being carried by the scale-platform.

Having thus described my invention, what I claim as new, and desire to secure by Letters Patent, is—

1. In combination with the platform of a scale, a scoop balancing device comprising a lever pivotally supported upon the platform, a weight permanently secured to one arm thereof, a pick up weight having a support independent of the scale platform but normally engaging the other arm of the lever and a scoop provided with a projection adapted to bear on one arm of said lever and cause the same to release the pick up weights; substantially as described.

2. The herein described scoop balance device comprising a pivoted lever, having a weight permanently attached to one end thereof, a pickup weight adapted to engage the other arm thereof, a rigidly immovable support for said pick-up weight independent of the platform, and a scoop provided with the projection adapted to engage one arm of said lever and release the same from its engagement with the pick-up weight; substantially as described.

3. The herein described scoop balance device comprising a lever pivotally supported from the scale platform, a weight $k$ permanently attached to one end of the short arm of said lever and normally tending to keep the long arm elevated against the under side of the platform, a second weight $o$ supported from the scale frame and adapted to be engaged by the long arm $m$ of the lever, and a scoop provided with a projection adapted to engage the long arm of the lever, the two weights $o$ and $k$ and the scoop being all approximately of the same weight, all substantially as described.

In testimony whereof I affix my signature in presence of two witnesses.

FREDERICK W. TAYLOR.

Witnesses:
J. C. CLARK,
WM. C. TYLER.